US010099607B1

(12) United States Patent
Williams et al.

(10) Patent No.: US 10,099,607 B1
(45) Date of Patent: Oct. 16, 2018

(54) VEHICLE UTILITY LIGHT ASSEMBLY

(71) Applicant: Toyota Motor Engineering & Manufacturing North America, Inc., Erlanger, KY (US)

(72) Inventors: Paxton S. Williams, Milan, MI (US); Matthew C. Tier, South Lyon, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/619,845

(22) Filed: Jun. 12, 2017

(51) Int. Cl.
*B60Q 3/30* (2017.01)
*B60Q 3/66* (2017.01)
*B60R 9/06* (2006.01)
*B60Q 3/00* (2017.01)
*B60Q 1/00* (2006.01)

(52) U.S. Cl.
CPC .............. *B60Q 3/30* (2017.02); *B60Q 3/66* (2017.02); *B60Q 1/00* (2013.01); *B60Q 3/00* (2013.01); *B60R 9/06* (2013.01)

(58) Field of Classification Search
CPC .................................. B60Q 3/30; B60Q 3/66
See application file for complete search history.

(56) References Cited

U.S. PATENT DOCUMENTS 6,786,623 B2   9/2004   Snyder et al.
9,291,324 B2   3/2016   Huebner et al.

OTHER PUBLICATIONS

Larson Electronics, "High Intensity LED Work Light on Trailer Hitch Mount—3-8.5 feet—150 Watts—14,790 Lumen" printed from http://www.larsonelectronics.com/p-50541-high-intensity-led-work-light-on-trailer-hitch-mount-150-watts-14790-lumen-10-32-volts-dc.aspx on Feb. 28, 2017 in 8 pages.

*Primary Examiner* — Joseph L Williams
(74) *Attorney, Agent, or Firm* — Christopher G. Darrow; Darrow Mustafa PC

(57) ABSTRACT

A vehicle utility light assembly is disclosed in which an elongated body portion functions to be stowable in a first position within a vehicle body panel. The elongated body portion further functions to be vertically-releasable from the first position to a second position, and being operable to selectively illuminate the vehicle body panel from above by a light source of the elongated body portion.

20 Claims, 3 Drawing Sheets

VEHICLE UTILITY LIGHT ASSEMBLY

FIELD

The subject matter described herein relates in general to vehicle utility light assemblies and, more particularly, to a vehicle utility light assembly being deployable from a vehicle body panel.

BACKGROUND

Vehicle lights, such as those for cargo areas, are not generally uniformly well illuminated. For the example of a pickup truck cargo area, an exterior light intended for illuminating the cargo bed is oftentimes provided proximate a rear window of the cab of the pickup truck. The exterior light, however, does not sufficiently illuminate the cargo area generally, casts excessive shadows over the contents of the cargo area, and has limited range and fixed direction. A need exists for a vehicle cargo light that may be stowed proximal to a vehicle cargo area, and deployed in response to a control signal for illuminating the vehicle cargo area. A need also exists for the vehicle cargo light to be positionable by a user to assist in illuminating a desired region of the cargo area, or to the outside area of the vehicle, such as aiding in vehicle repair and/or damage assessment.

SUMMARY

Devices for a vehicle utility light assembly are disclosed.

In one implementation, vehicle utility light assembly is disclosed that includes an elongated body portion, a light source, and a power source terminal. The elongated body portion has a first end portion, and the light source being proximal the first end portion. The power source terminal can be co-located with the elongated body portion, and being operable for coupling with a power source. The elongated body portion functions to be stowable in a first position within a vehicle body panel, and to be vertically-releasable from the first position to a second position operable to selectively illuminate the light source via the power source.

In another implementation, vehicle utility light assembly is disclosed in which an elongated body portion being stowable in a first position within a vehicle body panel. The elongated body portion being vertically-releasable from the first position to a second position, and being operable to selectively illuminate the vehicle body panel from above by a light source.

BRIEF DESCRIPTION OF THE DRAWINGS

The description makes reference to the accompanying drawings wherein like reference numerals refer to like parts throughout the several views, and wherein.

DETAILED DESCRIPTION

Figure 1:
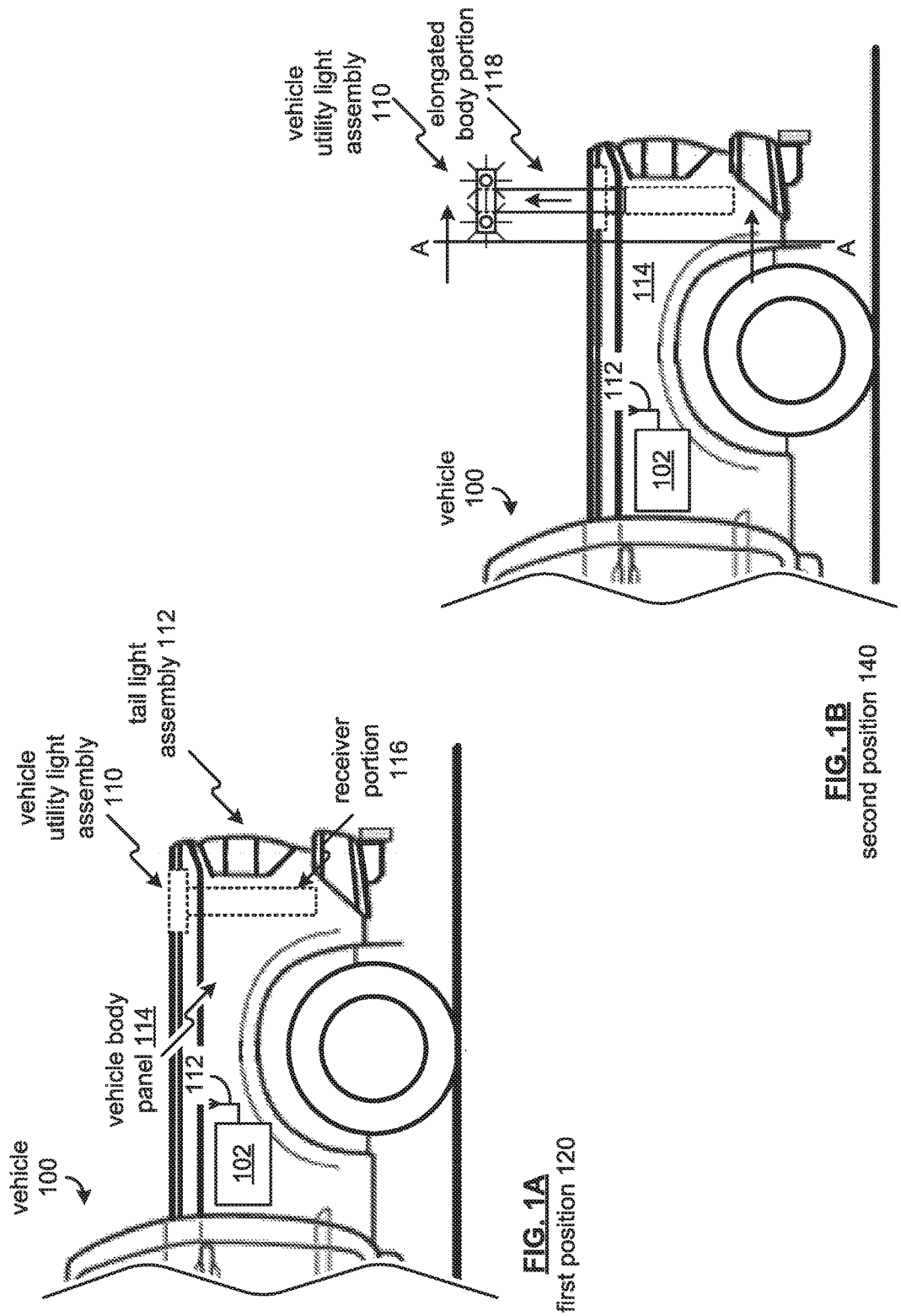
FIGS. 1A and 1B illustrate a vehicle including a vehicle utility light assembly in a first position and a second position 140, respectively.

A vehicle light assembly that includes an elongated body portion being stowable in a first position within a vehicle body panel, and being vertically-releasable from the first position to a second position operable to selectively illuminate the vehicle body panel from above by a light source is described herein. One example vehicle light assembly includes an elongated body portion having a first end portion, a light source proximal the first end portion, and a power source terminal co-located with the elongated body portion. The elongated body portion can be stowable in a first position within a vehicle body panel, and vertically-releasable from the first position to a second position being operable to selectively illuminate the light source via the power source terminal.

FIGS. 1A and 1B illustrate a vehicle 100 including vehicle utility light assembly 110 in a first position 120 and a second position 140, respectively. Vehicle 100 is shown as a pickup truck, put may also be other vehicle models including cargo areas that may accommodate the vehicle utility light assembly 110 as described herein.

In FIG. 1A, the vehicle utility light assembly 110 includes an elongated body portion being stowable in a first position 120 within a vehicle body panel 114. With respect to FIG. 1B, the elongated body portion is illustrated as being vertically-releasable from the first position 120 to a second position 140 operable to selectively illuminate the vehicle body panel 114 from above by a light source, as is described in detail with reference to FIG. 3.

As may be appreciated, the vehicle body panel 114 may wholly-enclose or partially-enclose a receiver portion 116 of the vehicle utility light assembly 110. The receiver portion 116 may function as a full or partial sleeve accepting an elongated body portion of the vehicle utility light assembly 110, as is described in detail with reference to FIG. 3. The receiver portion 116 may also function as an extension guide for the vehicle utility light assembly 110 for vertical movement of the light assembly 110 along a respective axis of the receiver portion 116.

Mechanisms that may be implemented to stow and/or release the vehicle utility light assembly 110 can include a manual latching mechanism (such as a push/push latch mechanism, push-button release, etc.) or a powered lift-mechanism (such as an electric motor, a hydraulic drive, and electromechanical drive, etc.).

By way of example, a push/push latch mechanism, in operation, may maintain the vehicle utility light assembly 110 in a stowed, or first position 120 of FIG. 1A upon an initial push along a longitudinal axis of an elongated body portion operates to engage a latch in the first position 120. A subsequent or second push along the longitudinal axis of the elongated body portion may operate to releases the latch mechanism so that the vehicle utility light assembly 110 may be vertically-releasable from the first position 120 to place the second position 140 (FIG. 1B). As may be appreciated, the vehicle utility light assembly 110 may be manually placed at the second position 140, and may also be powered via a lift mechanism to place the vehicle utility light assembly 110 at the second position 140. That is, upon sensing a release of the latch mechanism, the powered lift mechanism may be engaged to place the assembly 110 at the second position 140.

Without continuous vertical upward force sufficient to extend the vehicle utility light assembly 110 to a fully-extended position, such as that of FIG. 1B, the subsequent or second push may release, or unlatch, the vehicle utility light assembly 110 to a partially-extended state past an upper face of the vehicle body panel 114. The partially-extended state may provide a user with purchase sufficient to grasp and further manually extend the vehicle utility light assembly 110 to the second position 140 of FIG. 1B.

In FIGS. 1A and 1B, the vehicle 100 may include a vehicle control unit 102 and antenna 112, which may operate to receive control signals relating to control of the vehicle utility light assembly 110.

As may also be appreciated, when the vehicle utility light assembly 110 includes a powered lift-mechanism that can be operably coupled to be responsive to a control signal from the vehicle control unit 102. The control signal operates to prompt the powered lift-mechanism to release the vehicle utility light assembly 110 from the first position 120 to the second position 140. In this respect, the vehicle utility light assembly 110 can be responsive to the control signals from the vehicle control unit 102 to release the vehicle utility light assembly 110 from a first position 120 (FIG. 1A), to a second position 140 (FIG. 1B). The vehicle control unit 102 is described in detail with reference to FIG. 2.

The vehicle utility light assembly 110 includes a power source terminal co-located with an elongated body portion of the vehicle utility light assembly 110, which is described in detail with reference to FIG. 3.

As may be appreciated, the power source terminal may operate to provide power to a light source of the vehicle utility light assembly 110. The example of FIGS. 1A and 1B include a tail light assembly 112, which may be powered by a wiring harness of the vehicle 100. Similarly, a power source for the vehicle utility light assembly 110 may be provided through the wiring harness of the vehicle 100, and/or spliced as an after-market product by splicing into the powered-wires routed to the tail light assembly 112. Similarly, the vehicle utility light assembly 110 may include an adaptor operable to couple with a vehicle network of the vehicle 100 to receive control signals operable to remotely-control the vehicle utility light assembly 110, as is discussed in detail with reference to FIGS. 2 and 3.

Figure 2:
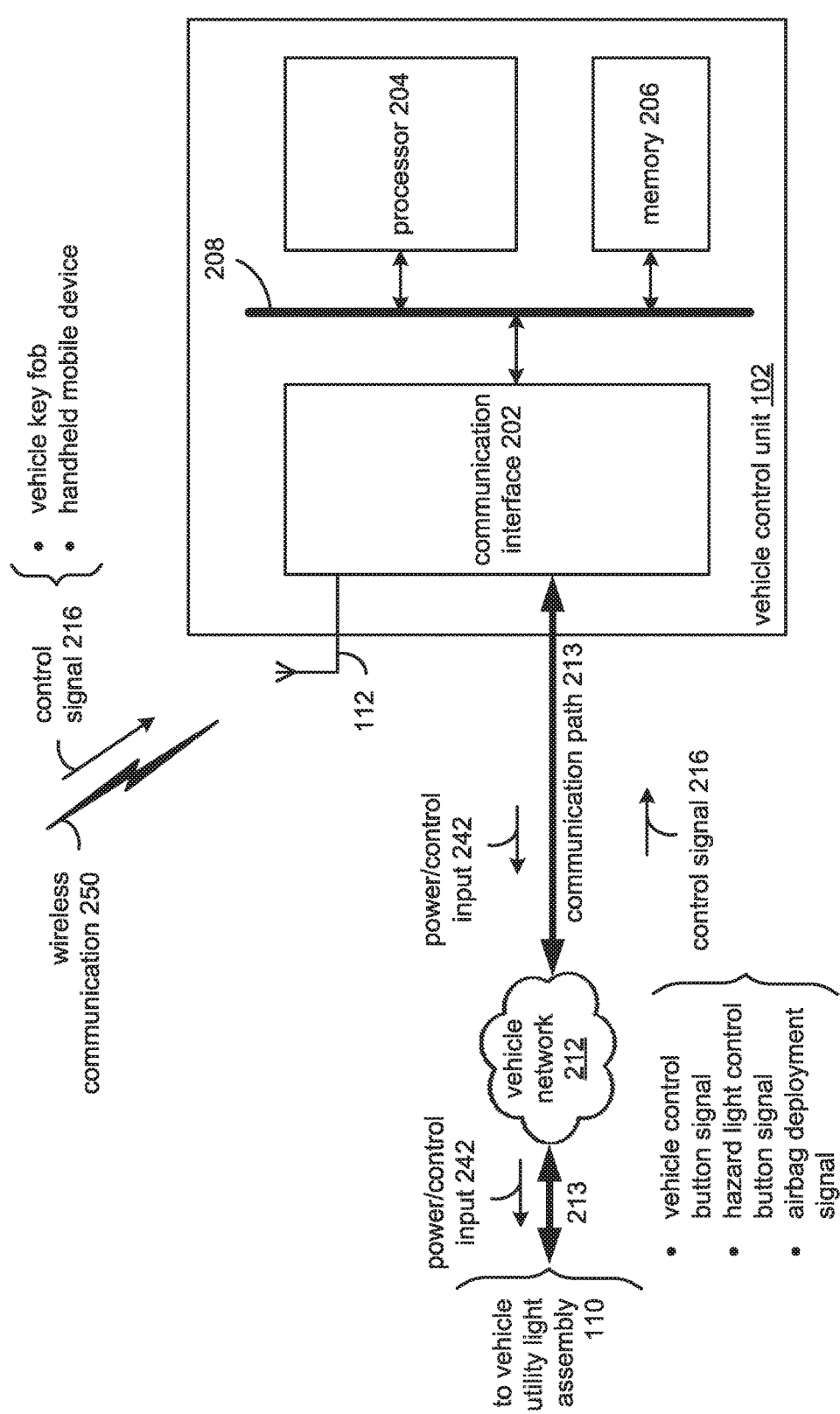
FIG. 2 illustrates a vehicle control unit 102 of the vehicle of FIGS. 1A and 1B.

FIG. 2 illustrates a block diagram of the vehicle control unit 102 of FIG. 1. The vehicle control unit 102 may include a communication interface 202, a processor 204, and memory 206, that are communicably coupled via a bus 208. The vehicle control unit 102 may provide automated functions to the vehicle utility light assembly 110 (FIGS. 1A and 1B), including stowing the vehicle utility light assembly 110 at a first position 120 (FIG. 1A) within the vehicle body panel 114, and releasing the vehicle light assembly 110 to a second position 140 operable to selectively illuminate a light source via a power source (FIG. 1B).

The processor 204 can be a conventional central processing unit or any other type of device, or multiple devices, capable of manipulating or processing information. As may be appreciated, processor 204 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The memory (and/or memory element) 206 may be communicably coupled to the processor 204, and may operate to store one or more modules described herein. The modules can include instructions that, when executed, cause the processor 204 to implement one or more of the various processes and/or operations described herein.

An example module may include instructions that, upon receiving a control signal 216, cause the processor 204 to generate and issue a power/control input 242 to the vehicle utility light assembly 110, which is described in detail with reference to FIG. 3.

The control signal 216 may be based on sources such as a key fob signal, a vehicle control button signal, a hazard light control button signal, and an air bag deployment signal. That is, the control signal 216 may be received wirelessly via the wireless communication 250 upon depressing a button of a vehicle key fob, manipulating an app being executable via a handheld mobile device, etc. In response, the control signal 216 may provide remote operation the vehicle utility light assembly 110 (such as deployment, brightness, lighting color, lighting pattern, etc.).

Similarly, the control signal 216 may be received via the communication path 213 of the vehicle network 212 upon depressing a physical and/or virtual button of a vehicle control button to generate a vehicle control button signal, a hazard light control button that may generate a hazard light control button signal, an airbag deployment signal, etc. As may be appreciated, physical switch devices may be presented to a user for input, as well as provided via a graphical user interface (GUI) displayed via vehicle monitors (such as a heads-up display, a head unit display, a control display, etc.). Moreover, the vehicle utility light assembly 110 may also be controlled in emergency situations. For example, upon an airbag deployment being issued (indicating a collision), the signal may serve as a control signal 216 to deploy the vehicle utility light assembly 110 in an emergency configuration having a high brightness level, and emergency light patterns to attract the attention of first responders. Through the physical and/or virtual user inputs, the control signal 216 may provide remote operation the vehicle utility light assembly 110 (such as deployment, brightness, lighting color, lighting pattern, etc.).

The memory and/or memory element 206 may be a single memory device, a plurality of memory devices, and/or embedded circuitry of the processor 204. Such a memory device may be a read-only memory, random access memory, volatile memory, non-volatile memory, static memory, dynamic memory, flash memory, cache memory, and/or any device that stores digital information. Furthermore, arrangements described herein may take the form of a computer program product embodied in one or more computer-readable storage medium having computer-readable program code embodied, e.g., stored, thereon. Any combination of one or more computer-readable media may be utilized. The computer-readable medium may be a computer-readable signal medium or a computer-readable storage medium.

The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device. Program code embodied on a computer-readable medium may be transmitted using any appropriate medium, including but not limited to wireless, wireline, optical fiber, cable, RF, etc., or any suitable combination of the foregoing.

The memory 206 is capable of storing machine readable instructions, or instructions, such that the machine readable instructions can be accessed and/or executed by the processor 204. The machine readable instructions can comprise logic or algorithm(s) written in programming languages, and generations thereof, (e.g., 1GL, 2GL, 3GL, 4GL, or 5GL) such as, for example, machine language that may be directly executed by the processor 204, or assembly language, object-oriented programming (OOP) such as JAVA, Smalltalk, C++ or the like, conventional procedural programming languages, scripting languages, microcode, etc., that may be compiled or assembled into machine readable instructions and stored on the memory 206. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods and devices described herein may be implemented in any conventional computer programming language, as pre-programmed hardware elements, or as a combination of hardware and software components.

Note that when the processor 204 includes more than one processing device, the processing devices may be centrally located (e.g., directly coupled together via a wireline and/or wireless bus structure) or may be distributed located (e.g., cloud computing via indirect coupling via a local area network and/or a wide area network). Further note that when the processor 204 implements one or more of its functions via a state machine, analog circuitry, digital circuitry, and/or logic circuitry, the memory and/or memory element storing the corresponding operational instructions may be embedded within, or external to, the circuitry including the state machine, analog circuitry, digital circuitry, and/or logic circuitry.

The vehicle control unit 102 can include one or more modules, at least some of which are described herein. The modules may be considered as functional blocks that can be implemented in hardware, software, firmware and/or computer-readable program code that perform one or more functions. A module, when executed by a processor 204, implements one or more of the various processes described herein. One or more of the modules can be a component of the processor(s) 204, or one or more of the modules can be executed on and/or distributed among other processing systems to which the processor(s) 204 is operatively connected. The modules can include instructions (e.g., program logic) executable by one or more processor(s) 204.

The communication interface 202 generally governs and manages the data received via a vehicle network 212. There is no restriction on the present disclosure operating on any particular hardware arrangement and therefore the basic features herein may be substituted, removed, added to, or otherwise modified for improved hardware and/or firmware arrangements as they may develop.

The antenna 112 may include one or more conductive elements that interact with electromagnetic signals transmitted by global positioning system satellites. The received signals may be transformed into a data signal indicative of control signal 216 for operation of the vehicle utility light assembly 110.

The vehicle control unit 102 may be communicatively coupled to receive signals from global positioning system satellites, such as via the antenna 112 of the vehicle control unit 110, or other such vehicle antennae (not shown). The antenna 112 operates to provide communications with the vehicle control unit 102 through wireless communication 250.

The wireless communication 250 may be based on one or many wireless communication system specifications. For example, wireless communication systems may operate in accordance with one or more standards specifications including, but not limited to, 3GPP (3rd Generation Partnership Project), 4GPP (4th Generation Partnership Project), 5GPP (5th Generation Partnership Project), LTE (long term evolution), LTE Advanced, RFID, IEEE 802.11, Bluetooth, AMPS (advanced mobile phone services), digital AMPS, GSM (global system for mobile communications), CDMA (code division multiple access), LMDS (local multi-point distribution systems), MMDS (multi-channel-multi-point distribution systems), IrDA, Wireless USB, Z-Wave, Zig-Bee, and/or variations thereof.

As may be appreciated, the communication path 213 of the vehicle network 212 may be formed from a medium suitable for transmitting a signal such as, for example, conductive wires, conductive traces, conductive wires, connectors, buses, optical waveguides, or the like. Moreover, the communication path 213 can be formed from a combination of mediums capable of transmitting signals to permit the transmission of electrical data signals to components such as processors, memories, sensors, input devices, output devices, and communication devices.

Accordingly, the communication path 213 may be provided by a vehicle bus, or combinations thereof, such as for example, a Body Electronic Area Network (BEAN), a Controller Area Network (CAN) bus configuration, an Audio Visual Communication-Local Area Network (AVC-LAN) configuration, a Local Interconnect Network (LIN) configuration, a Vehicle Area Network (VAN) bus, and/or other combinations of additional communication-system architectures to provide communications between devices and systems of the vehicle 100.

The term "signal" may be understood to relate to a waveform (e.g., electrical, optical, magnetic, mechanical or electromagnetic), such as DC, AC, sinusoidal-wave, triangular-wave, square-wave, vibration, and the like, capable of traveling through at least some of the mediums described herein.

Figure 3:
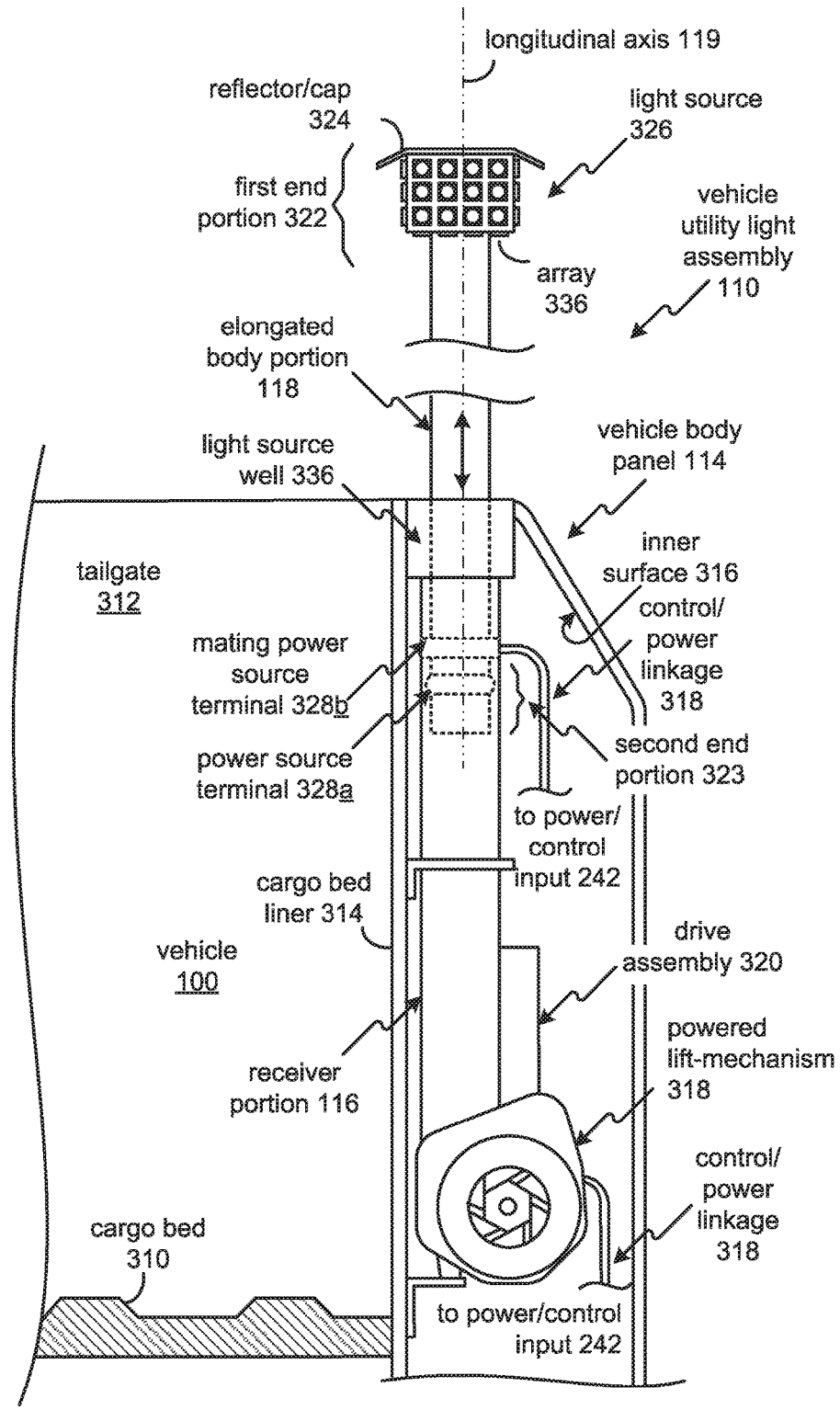
FIG. 3 illustrates a cross-sectional view of a vehicle body panel including a vehicle light assembly viewed from the cross-sectional lines A-A of FIG. 1B.

FIG. 3 is a cross-sectional view of a vehicle body panel including a vehicle light assembly 110 viewed from the cross-sectional lines A-A of FIG. 1B towards tailgate 312.

The vehicle light assembly 110 is shown within vehicle body panel 114, as indicated by the inner surface 316. The vehicle light assembly 110 may include an elongated body portion 118 defining a longitudinal axis 119 and having a first end portion 322. A light source 326 is shown proximal the first end portion 326 for providing selective illumination of the outer surfaces of vehicle body panel 114 and the cargo area of the vehicle 100, such as the cargo bed 310 and cargo bed liner 314. In the stowed configuration of the first position 120 (FIG. 1A), the light source well 336 may receive the light source 326, which may be further covered and/or protected by reflector/cap 324.

A power source terminal 328a may be co-located with the elongated body portion 118 proximal to a second end portion 323. The power source terminal 328a may operate to communicatively couple with a power source such as a wiring harness of the vehicle 100. In the example of FIG. 3, the power source terminal 328a may communicatively couple with a mating power source terminal 328b of the receiver portion 116. As may be appreciated, a power linkage 318 may function to communicatively couple the mating power source terminal 328b with power/control input 242. The power/control input may include conductors for providing power, as well as conductors for providing control data, to the vehicle utility light assembly 110.

As discussed above, mechanisms that may be implemented to stow and/or release the vehicle utility light assembly 110 using a manual latching mechanism (such as a push/push latch mechanism, push-button release, etc.) or a powered lift-mechanism (such as an electric motor, a hydraulic drive, and electromechanical drive, etc.).

Mechanisms that may be implemented to stow and/or release the vehicle utility light assembly 110 can include a manual latching mechanism (such as a push/push latch mechanism, push-button release, etc.) or a powered lift-mechanism (such as an electric motor, a hydraulic drive, and electromechanical drive, etc.).

By way of example, a push/push latch mechanism, in operation, may maintain the vehicle utility light assembly 110 in a stowed, or first position 120 of FIG. 1A upon an initial push to engage a latch. A subsequent push may operate to releases the latch mechanism so that the vehicle utility light assembly 110 may be vertically-releasable from the first position 120 to the second position 140 (FIG. 1B).

For remote operation, a powered lift-mechanism 318 may be operably coupled via a control/power linkage 318 to be responsive to a control signal 216 (FIG. 2), such as may be provided by a vehicle control unit 102. The powered lift-mechanism 318 may be provided by various devices, such as an electric motor, a hydraulic drive, an electromechanical device, or a combination thereof.

The control signal 216 may operate to prompt the powered lift-mechanism 318 to release the light source 326 from the first position (that is, contained by light source well 336) and to extend the light source 326 to the second position for selectively illuminating the vehicle body panel 114, and cargo area (such as cargo bed 310 and cargo bed liner 314).

When engage, the powered lift-mechanism 318 may provide lift to the elongated body portion 118. The lift may be conveyed directly via a gear-based relation, or via a translated manner such as via a drive assembly 320 based upon the desired configuration that may be contained by the inner surface 316 of the vehicle body panel 114.

The vehicle utility light assembly 100 of FIG. 3 shows partial-extension of the elongated body portion 118 to the second position 140. In this respect, the power source terminal 328a and the mating power source terminal 328b correlation may be better shown to provide selective illumination by the light source 326 upon operative coupling with the power/control input 242. The mating power source terminal 328b may be configured as "hot" such that when the power source terminal 328a engages terminal 328b, the light source 326 may also be powered.

The elongated body portion 118 may include a semi-rigid rod receiving a conductor (such as a trace, a wire and/or data wires) for coupling the light source 326 with the power source terminal 328a. Other configurations may be used for providing the elongated body portion 118, such as a segmented, telescoping member that may extend from a collapsed state to an extended state, a coiled member having a "material memory" to return to a coiled state after being extended to a second position for illumination, etc.

With a semi-rigid material, the rod may be adjusted by a user to direct the light source 326 to areas of interest. For example, the light source 326 may be directed towards areas of the cargo area to look for items, as well as to areas outside the vehicle, such as along the vehicle body panel 114, such as an area adjacent the vehicle wheels. In this regard, the light source 326 provides utility within the cargo area, and inspection and/or repair of the vehicle on the outer periphery (such as a flat tire, object struck the outside, etc.).

The light source 326 includes an array 336 of light elements, where each element may be provided by a filament device (such as an incandescent element), a gas discharge device (such as a Xenon light element), a solid-state devices (such as LED elements), etc. The array 336 may further be made of a combination of devices, or a singular form of device. The array 336 may cover the surface of the first end portion 322. By the example of FIG. 3, the array 336 may have elements positioned on the four-side surfaces in a grid pattern, and the bottom surface oriented downward (leaving an accommodation for the elongated body portion 118).

With respect to durability, power consumption, and heat generation, solid-state devices permit low-power consumption, small footprint, and individual element control relating to brightness, color, activation, etc. Examples of such solid-state devices may include organic and non-organic light emitting diode (LED) elements. Varying structures of Light Emitting Diodes may be manufactured from compound semiconductor materials such as Gallium Arsenide, Gallium Arsenide Phosphide, Silicon Carbide and Gallium Iridium Nitride, which may further be mixed together in different ratios to produce a unique distinctive color wavelengths.

Different semiconductor compounds emit light in definite regions of the visible light spectrum and therefore they produce different intensity levels of light. The respective semiconductor material used in manufacturing of an LED element operates to determine the wavelength of the photon emissions and the resulting color of the emitted light.

Accordingly, each element of the array 336 may be individually addressed and/or operated via the power/control input 242, which may be produced by a vehicle control unit 102 (FIGS. 1A, 1B and 2). In this respect, a first mode of the light source 326 may provide white light (with adjustable brightness) for illuminating the cargo area of the vehicle 100 (including the cargo bed 310 and cargo bed liner 314), as well as the vehicle body panel 113 from above. The reflector/cap 324 may further direct light from the light source 326 downward. A second mode of the light source may provide varying colors and/or patterns to attract attention, to request help, caution, etc. A third mode of the light source 326 may provide general ambience relating to festive outdoor activities (such as parties, barbeques, etc.).

Detailed embodiments are disclosed herein relating to a vehicle utility light assembly. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-3, but the embodiments are not limited to the illustrated structure or application.

As one of ordinary skill in the art may appreciate, the term "substantially" or "approximately," as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items range from a difference of a few percent to magnitude differences. As one of ordinary skill in the art may further appreciate, the term "coupled," as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (that is, where one element is coupled to another element by inference) includes direct and indirect coupling between two elements in the same manner as "coupled."

As the term "module" may be used, a module includes a functional block that is implemented in hardware, software, and/or firmware that performs one or more functions such as the processing of an input signal to produce an output signal. As used herein, a module may contain submodules that themselves are modules.

The flowcharts and block diagrams that may be presented in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage medium, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A vehicle utility light assembly comprises:
   an elongated body portion having a first end portion;
   a light source proximal the first end portion;
   a power source terminal co-located with the elongated body portion, the power source terminal being operable for coupling with a power source; and
   wherein the elongated body portion being:
      stowable in a first position within a vehicle body panel; and
      vertically-releasable from the first position to a second position operable to selectively illuminate the vehicle body panel by the light source via the power source.

2. The vehicle utility light assembly of claim 1, wherein the elongated body portion comprises:
   a semi-rigid rod receiving a conductor for coupling the light source with the power source terminal.

3. The vehicle utility light assembly of claim 2, further comprising:
   a push/push latch mechanism, wherein a first push along a longitudinal axis of the elongated body portion operates to place the light source in the first position, and a second push along the longitudinal axis of the elongated body portion operates to release the elongated body portion to place the light source in the second position.

4. The vehicle utility light assembly of claim 1, further comprising:
   a powered lift-mechanism operably coupled to be responsive to a control signal, wherein the control signal operates to prompt the powered lift-mechanism to release the light source from the first position to the second position.

5. The vehicle utility light assembly of claim 4, wherein the powered lift-mechanism comprises at least one of:
   an electric motor;
   a hydraulic drive; and
   an electromechanical drive.

6. The vehicle utility light assembly of claim 4, wherein the control signal comprises at least one of:
   a key fob signal;
   a vehicle control button signal;
   a hazard light control button signal; and
   an airbag deployment signal.

7. The vehicle utility light assembly of claim 6, wherein the light source further comprises:
   a light emitting diode (LED) array including a plurality of LED elements, each of the plurality of LED elements being controllable by the control signal.

8. A vehicle utility light assembly comprises:
   an elongated body portion having a first end portion and a second portion;
   a light source proximal the first end portion;
   a power source terminal co-located with the elongated body portion, the power source terminal being operable for coupling with a power source;
   a receiver portion adapted to receive the elongated body portion;
   a mating power source terminal co-located with the receiver portion configured to communicatively couple with the power source terminal; and wherein the elongated body portion being:
  stowable in a first position within a vehicle body panel; and
  vertically-releasable relative to the vehicle body panel from the first position to a second position to communicatively couple the power source terminal with the mating power source terminal to selectively illuminate the vehicle body panel by the light source via the power source.

9. The vehicle utility light assembly of claim 8, wherein the elongated body portion comprises:
  a semi-rigid rod receiving a conductor for coupling the light source with the power source terminal.

10. The vehicle utility light assembly of claim 9, further comprising:
  a push/push mechanism, wherein a first push along a longitudinal axis of the elongated body portion operates to place the light source in the first position, and a second push along the longitudinal axis of the elongated body portion operates to release the elongated body portion to place the light source in the second position.

11. The vehicle utility light assembly of claim 8, further comprising:
  a lift mechanism operably coupled to be responsive to a control signal, wherein the control signal operates to prompt the lift mechanism to release the light source from the first position to the second position.

12. The vehicle utility light assembly of claim 11, wherein the lift mechanism comprises at least one of:
  an electric motor;
  a hydraulic drive; and
  an electromechanical drive.

13. The vehicle utility light assembly of claim 11, wherein the control signal comprises at least one of:
  a key fob signal;
  a vehicle control button signal;
  a hazard light control button signal; and
  an air bag deployment signal.

14. The vehicle utility light assembly of claim 13, wherein the light source further comprises:
  a light emitting diode (LED) array including a plurality of LED elements, each of the plurality of LED elements being controllable by the control signal.

15. A vehicle utility light assembly comprises:
  an elongated body portion being stowable in a first position within a vehicle body panel; and
  the elongated body portion being vertically-releasable from the first position to a second position operable to selectively illuminate the vehicle body panel from above by a light source of the elongated body portion.

16. The vehicle utility light assembly of claim 15, wherein the elongated body portion comprises:
  a semi-rigid rod receiving a conductor for coupling the light source with a power source terminal.

17. The vehicle utility light assembly of claim 16, further comprises:
  a push/push mechanism, wherein a first push along a longitudinal axis of the elongated body portion operates to place the light source in the first position, and a second push exerted along the longitudinal axis of the elongated body portion operates to release the elongated body portion for placing the light source at the second position.

18. The vehicle utility light assembly of claim 15, further comprises:
  a lift mechanism operably coupled to be responsive to a control signal, wherein the control signal operates to prompt the lift mechanism to vertically-release the elongated body portion from the first position to the second position.

19. The vehicle utility light assembly of claim 18, wherein the lift mechanism comprises at least one of:
  an electric motor;
  a hydraulic drive; and
  an electromechanical drive.

20. The vehicle utility light assembly of claim 15, wherein the light source further comprises:
  a light emitting diode (LED) array including a plurality of LED elements, each of the plurality of LED elements being controllable by a control signal.

* * * * *